United States Patent [19]

Guthrie et al.

[11] Patent Number: 5,481,803
[45] Date of Patent: Jan. 9, 1996

[54] SAFETY FEEDER

[76] Inventors: Ort S. Guthrie; Mindy K. Guthrie, both of P.O. Box 118, Haines, Oreg. 97833

[21] Appl. No.: 420,143

[22] Filed: Apr. 11, 1995

[51] Int. Cl.⁶ ............................. A47J 17/00; A47J 25/00
[52] U.S. Cl. .................. 30/113.3; 30/113.1; 30/123.5; 30/130; 30/299; 99/542; 99/544; 99/588; D7/693
[58] Field of Search ............................. 99/537, 538, 539, 99/540–545, 584, 588; D7/695, 693, 696; 30/113.1, 113.3, 113.2, 123.5, 299, 300, 278, 128, 130

[56] References Cited

U.S. PATENT DOCUMENTS

| | | | |
|---|---|---|---|
| 3,621,899 | 11/1971 | Hula | D7/695 |
| 3,769,706 | 11/1973 | Ashdown | 30/113.3 |
| 3,885,307 | 5/1975 | Papalardo | 30/123.5 |
| 4,010,541 | 3/1977 | Papineau | 30/113.3 |
| 4,246,700 | 1/1981 | Coulon et al. | 99/544 |
| 4,546,545 | 10/1985 | Hirano | 99/543 |
| 4,596,073 | 6/1986 | Ewald | 30/113.1 |
| 4,690,047 | 9/1987 | Balzano | 99/542 |
| 4,763,414 | 8/1988 | McNeill, II | 99/538 |
| 4,980,977 | 1/1991 | Matin et al. | 30/286 |
| 5,052,108 | 10/1991 | Yang et al. | 30/123.5 |
| 5,101,718 | 4/1992 | Lin | 99/545 |

Primary Examiner—Timothy F. Simone

[57] ABSTRACT

A safety peeler including a short cylindrical shell having a closed exterior portion and an open interior portion with a cylindrical extension extending therefrom including an external threaded portion and an exterior surface therebetween with a top edge and a bottom edge; a rectangular tab with an upper edge, a lower edge being in communication with the top portion of the shell and four vertical sides being equally spaced from the top edge of the exterior surface of the shell, the upper edge capable of cutting away the skin of a citrus fruit; a long cylinder being hollow having an interior opening with a top edge, an exterior opening with a bottom edge and an exterior surface and an internal wall therebetween including an internal threaded portion being adjacent to the top edge of the interior opening, the internal threaded portion capable of engaging the external threaded portion of the cylindrical shell; a cylindrical tapered edge having an upper edge in communication with the bottom edge of the exterior opening of the long cylinder and a lower edge extending exteriorly therefrom; and a longitudinal slot formed in the long cylinder for releasing air pressure to allow ease of insertion of the cylinder into the apple core.

14 Claims, 4 Drawing Sheets

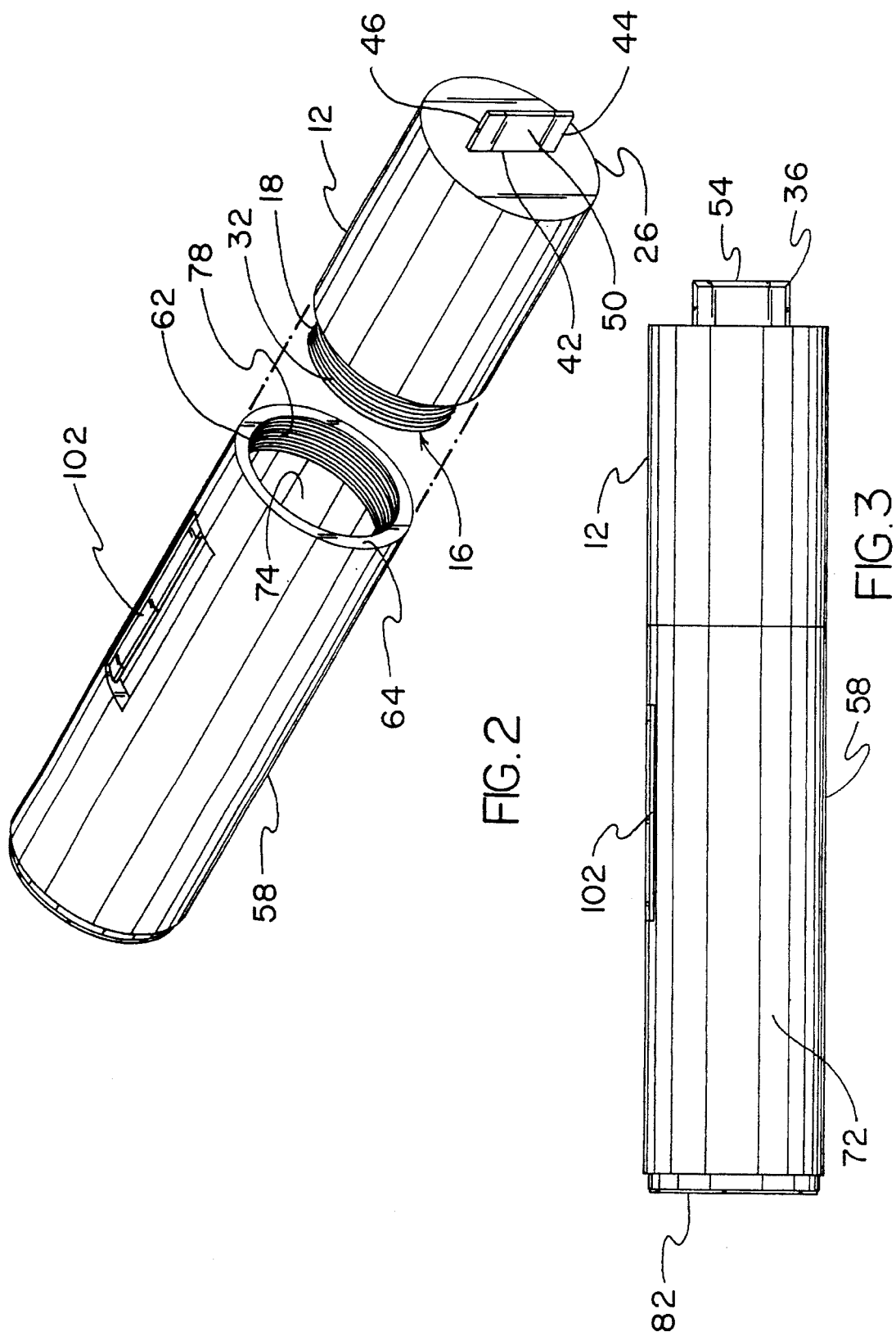

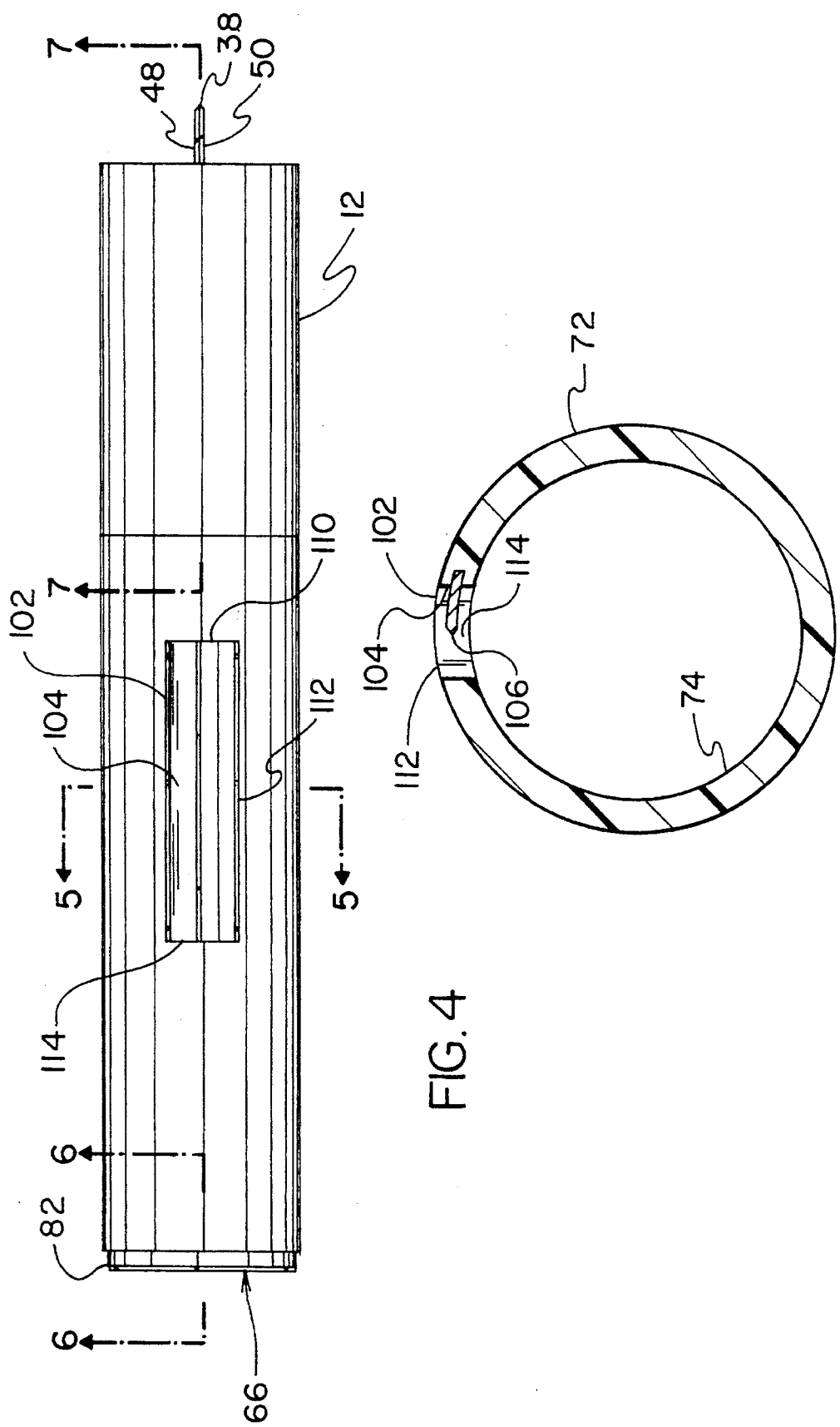

SAFETY FEEDER

BACKGROUND OF THE INVENTION

1. Field of the Invention

The present invention relates to a safety peeler and more particularly pertains to providing an instrument with a unique combination of features to safely allow peeling and cutting of a piece of fruit to be eaten with one end of the instrument and further allowing a piece of fruit to be peeled and cored safely when using an opposite end of the instrument.

2. Description of the Prior Art

The use of fruit peelers and corers is known in the prior art. More specifically, fruit peelers and corers heretofore devised and utilized for the purpose of peeling and/or coring of fruit are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,246,700 to Coulon and Amour discloses an apparatus for cutting out and extracting the pulp of a fruit or vegetable without ruining its peel or rind. U.S. Pat. No. 4,596,073 to Ewald discloses an apple corer with a core remover. U.S. Pat. No. 4,690,047 to Balzano discloses a tool for peeling and coring pineapples and the like. U.S. Pat. No. 4,980,977 to Matin, Pelton and Trepus discloses a safety core cutting knife. Lastly, U.S. Pat. No. 5,157,836 to Aulbers, Been, d'Hond and Knoppers discloses a tool for separating a core, a rind and flesh of a fruit, in particular a pineapple.

In this respect, the safety peeler according to the present invention substantially departs from the conventional concepts and designs of the prior art, and in doing so provides an apparatus primarily developed for the purpose of providing an instrument with a unique combination of features to safely allow peeling and cutting of a piece of fruit to be eaten with one end of the instrument and further allowing a piece of fruit to be peeled and cored safely when using an opposite end of the instrument.

Therefore, it can be appreciated that there exists a continuing need for a new and improved safety peeler which can be used for providing an instrument with a unique combination of features to safely allow peeling and cutting of a piece of fruit to be eaten with one end of the instrument and further allowing a piece of fruit to be peeled and cored safely when using an opposite end of the instrument. In this regard, the present invention substantially fulfills this need.

SUMMARY OF THE INVENTION

In view of the foregoing disadvantages inherent in the known types of fruit peelers and corers now present in the prior art, the present invention provides an improved safety peeler. As such, the general purpose of the present invention, which will be described subsequently in greater detail, is to provide a new and improved safety peeler and method which has all the advantages of the prior art and none of the disadvantages.

To attain this, the present invention essentially comprises, in combination, a short cylindrical shell of a rigid material having a closed exterior portion and an open interior portion with a cylindrical extension extending therefrom and an exterior surface therebetween with a top edge and a bottom edge. The exterior surface is about 1 inch in diameter. The short cylindrical shell has a length of about 3 inches in length with the cylindrical extension being about 10 percent of the length. The cylindrical extension has a diameter of about ⅞ inch including an external threaded portion. A generally rectangular tab of rigid material is included. The tab has a thin keen edged upper edge, a rectangular lower edge in communication with the top portion of the shell and four vertical sides. The tab has a width of about ½ inch and a height of about ¼ inch. Each vertical side is equally spaced from the top edge of the exterior surface of the shell. The upper edge has a linear taper capable of cutting a fruit to the depth of about ¼ inch. The upper edge further is capable of cutting away the skin of a citrus fruit. A long cylinder of rigid material that is hollow is included. The long cylinder has an interior opening with a top edge, an exterior opening with a bottom edge and an exterior surface and an internal wall therebetween. The long cylinder has a length of about 5 inches. The exterior surface is about 1 inch in diameter and has a length equal to the length of the long cylinder. The internal wall with a length equal to the length of the cylinder includes an internal threaded portion. The internal threaded portion is adjacent to the top edge of the interior opening and is about ten percent of the length of the internal wall. The internal threaded portion further is capable of engaging the external threaded portion of the cylindrical shell and placing the long cylinder juxtaposed with the short cylindrical shell. A cylindrical tapered edge is included The cylindrical edge has an upper edge in communication with the bottom edge of the exterior opening of the long cylinder and a lower edge with a thin keen edge extending exteriorly therefrom. The tapered edge is about ¼ inch and 5 percent of the length of the long cylinder. The tapered edge further is capable of boring into an apple at the apple core with the lower edge and causing the core to be slidably received between the internal wall of the long cylinder. Lastly, a longitudinal slot formed in the long cylinder having a generally rectangular configuration is provided. The slot has a side extent with a thin keen edge and three flush end edges. The slot has a length with the side extent having a length equal to the length of the slot. The slot is in communication with the exterior surface of the long cylinder. The slot is in communication with the internal wall of the long cylinder for release of air pressure to allow ease of insertion of the long cylinder into the apple core. The slot is about twenty five percent of the length of the internal wall and the exterior surface of the long cylinder. The keen edge of the side extent of the slot is capable of peeling away skin of a thin skinned fruit. The peeling is accomplished when the tapered edge of the long cylinder is not being used.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved safety peeler which has all of the advantages of the prior art fruit peelers and corers and none of the disadvantages.

It is another object of the present invention to provide a new and improved safety peeler which may be easily and efficiently manufactured and marketed.

It is further object of the present invention to provide a new and improved safety peeler which is of durable and reliable constructions.

An even further object of the present invention is to provide a new and improved safety peeler which is susceptible of a low cost of manufacture with regard to both materials and labor, and which accordingly is then susceptible of low prices of sale to the consuming public, thereby making such safety peeler economically available to the buying public.

Still yet another object of the present invention is to provide a new and improved safety peeler which provides in the apparatuses and methods of the prior art some of the advantages thereof, while simultaneously overcoming some of the disadvantages normally associated therewith.

Even still another object of the present invention is to provide an instrument with a unique combination of features to safely allow peeling and cutting of a piece of fruit to be eaten with one end of the instrument and further allowing a piece of fruit to be peeled and cored safely when using an opposite end of the instrument.

Lastly, it is an object of the present invention to provide a new and improved safety peeler comprising a short cylindrical shell having a closed exterior portion and an open interior portion with a cylindrical extension extending therefrom including an external threaded portion and an exterior surface therebetween with a top edge and a bottom edge; a generally rectangular tab with an upper edge, a lower edge being in communication with the top portion of the shell and four vertical sides being equally spaced from the top edge of the exterior surface of the shell, the upper edge capable of cutting away the skin of a citrus fruit; a long cylinder being hollow having an interior opening with a top edge, an exterior opening with a bottom edge and an exterior surface and an internal wall therebetween including an internal threaded portion being adjacent to the top edge of the interior opening, the internal threaded portion capable of engaging the external threaded portion of the cylindrical shell and placing the long cylinder juxtaposed with the short cylindrical shell; a cylindrical tapered edge having an upper edge in communication with the bottom edge of the exterior opening of the long cylinder and a lower edge extending exteriorly therefrom; and a longitudinal slot formed in the long cylinder being in communication with the exterior surface and the internal wall of the long cylinder having a side extent and three flush end edges, the slot capable of releasing air pressure to allow ease of insertion of the cylinder into the apple core.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an exploded perspective view of the present invention of FIG. 1.

FIG. 3 is a longitudinal view of the present invention in an operable configuration.

FIG. 4 is a longitudinal view of the present invention showing the slot in an operable configuration.

FIG. 5 is a cross-sectional view of the present invention taken along line 5—5 of FIG. 4.

The same reference numerals refer to the same parts through the various Figures.

DESCRIPTION OF THE PREFERRED EMBODIMENT

Figure 1:
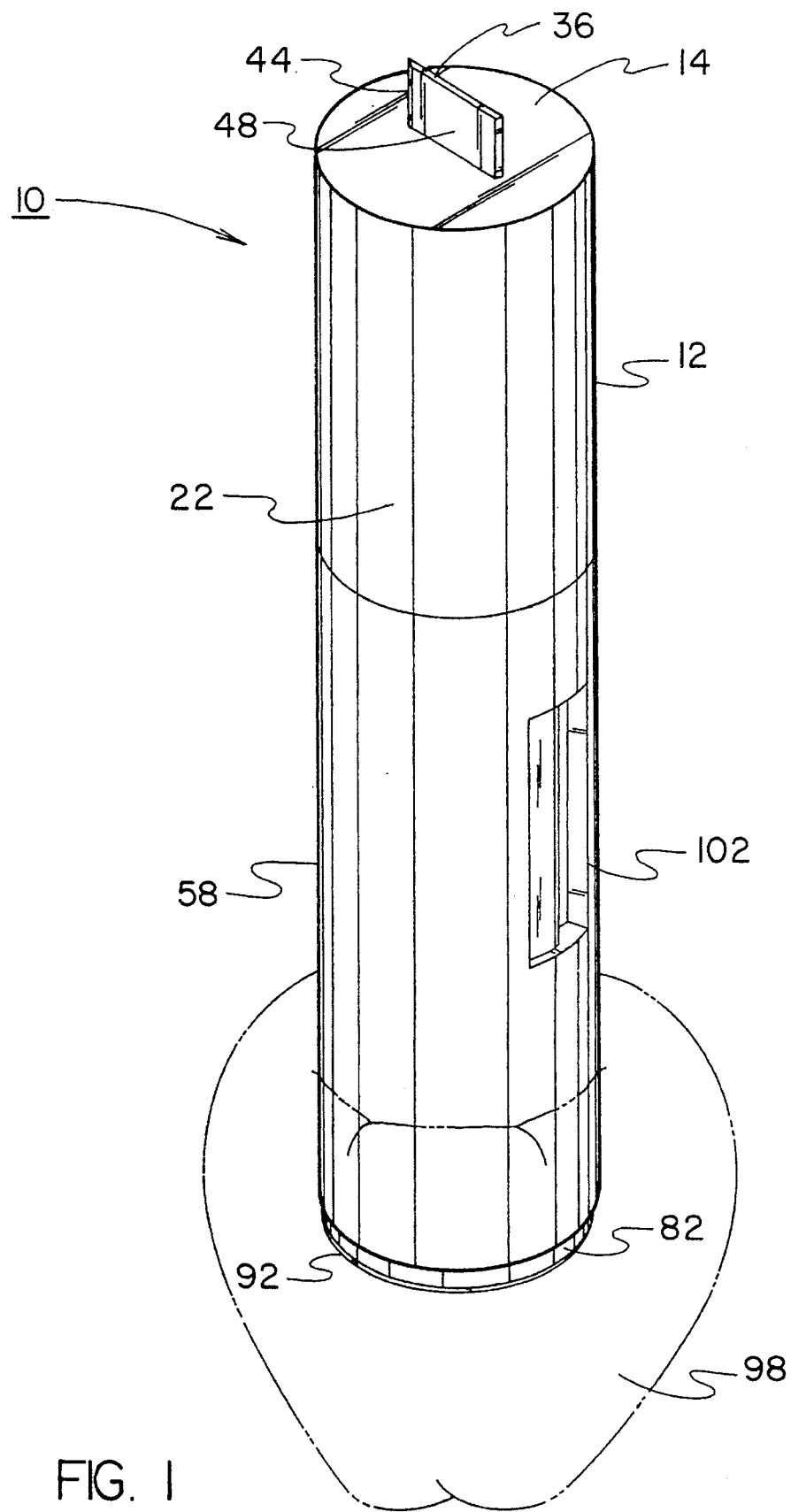
FIG. 1 is a perspective view of the preferred embodiment of the safety peeler constructed in accordance with the principles of the present invention.

With reference now to the drawings, and in particular to FIG. 1 thereof, the preferred embodiment of the new and improved safety peeler embodying the principles and concepts of the present invention and generally designated by the reference numeral 10 will be described.

The present invention, the safety peeler 10 is comprised of a plurality of components. Such components in their broadest context include a short cylindrical shell, a tab, a long cylinder, and a slot. Such components are individually configured and correlated with respect to each other so as to attain the desired objective.

Specifically, the present invention includes a short cylindrical shell 12. The shell is formed a rigid material such as plastic. The shell has a closed exterior portion 14 and an open interior portion with a cylindrical extension extending 18 therefrom and an exterior surface 22 therebetween with a top edge 26 and a bottom edge 28 as shown in FIG. 2. The exterior surface being about 1 inch in diameter. The short cylindrical shell has a length of about 3 inches with the cylindrical extension being about 10 percent of the length.

The cylindrical extension has a diameter of about ⅞ inch including an external threaded portion 32 as shown in FIG. 2.

Also included is a generally rectangular tab 36 as shown in FIG. 3. The tab is formed of a rigid material, preferably plastic. The tab has a thin keen edge upper edge 38, a rectangular lower edge 42 being in communication with the top portion of the shell 12 and four vertical sides 44,46,48, 50. FIG. 4 best depicts the thin keen edge of the upper edge. The tab has a width of about ½ inch and a height of about ¼ inch. Each vertical side being equally spaced from the top edge of the exterior surface of the shell as shown in FIG. 1. As best illustrated in FIG. 3, the upper edge has a linear taper 54 capable of cutting a fruit to the depth of about ¼ inch. The upper edge further being capable of cutting away the skin of a citrus fruit. The tab pierces the skin of the fruit at an angle so as not to pierce the meat of the fruit and allow for easy peeling.

Figure 7:
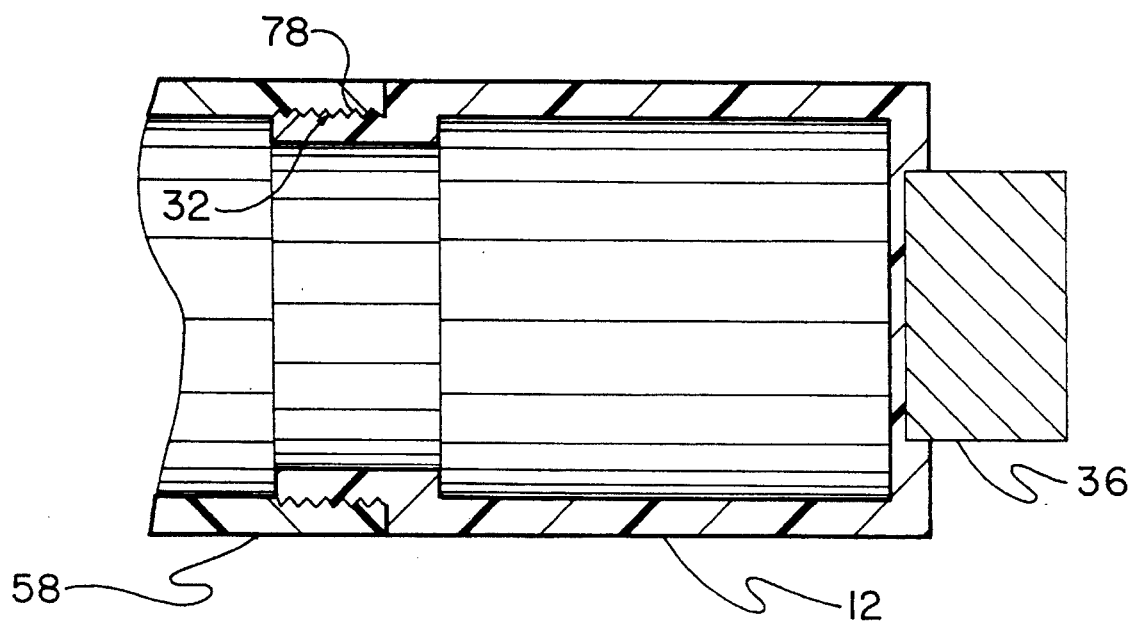
FIG. 7 is a longitudinal sectional view of the present invention taken along line 7—7 of FIG. 4.

Further, a long cylinder 58 is provided as shown in FIG. 2. The long cylinder is formed of a rigid plastic material. The long cylinder 58 is hollow with an interior opening 62 having a top edge 64, an exterior opening 66 having a bottom edge 68 and an exterior surface 72 and an internal wall 74 therebetween. The long cylinder has a length of about 5 inches. The exterior surface is about 1 inch in diameter and has a length equal to the length of the long cylinder. The internal wall has a length equal to the length of the cylinder and includes an internal threaded portion 78 as shown in FIG. 2. The internal threaded portion being adjacent to the top edge of the interior opening and being about ten percent of the length of the internal wall 74. As illustrated in FIG. 7, the internal threaded portion 78 is capable of engaging the external threaded portion 32 of the cylindrical shell 12 and placing the long cylinder juxtaposed with the short cylindrical shell.

Figure 6:
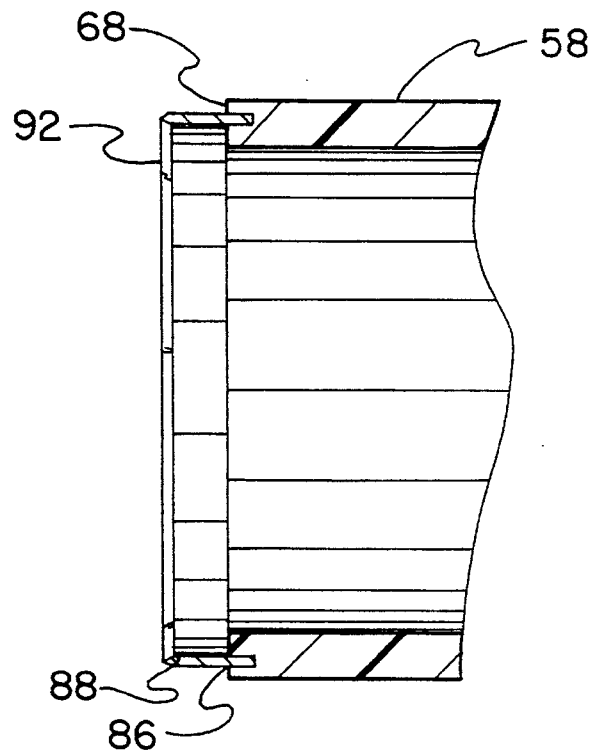
FIG. 6 is a fragmentary sectional view of the cylindrical tapered edge taken along line 6—6 of FIG. 4.

A cylindrical tapered edge 82 is incorporated as shown in FIG. 4. The cylindrical tapered edge has an upper edge 86 in communication with the bottom edge 68 of the exterior opening 66 of the long cylinder 58 and a lower edge 88 with a thin keen edge 92 extending exteriorly therefrom. FIG. 6 shows the keen edge of the tapered edge. The tapered edge is about ¼ inch and 5 percent of the length of the long cylinder. The tapered edge further being capable of boring into an apple 98 at the apple core with the lower edge and causing the core to be slidably received between the internal wall of the long cylinder. The internal wall 74 has a smooth surface so as not to constrict the movement of the apple core within.

Lastly, a longitudinal slot 102 formed in the long cylinder 58 is provided. As best illustrated in FIG. 5, the slot has a generally rectangular configuration with a side extent 104 having a thin keen edge 106 and three flush end edges 110, 112 and 114. The slot has a length with the side extent having a length equal to the length of the slot. The slot is in communication with the exterior surface 72 of the long cylinder. The slot is in communication with the internal wall 74 of the long cylinder for release of air pressure to allow ease of insertion of the cylinder into the apple core. Air pressure will build up in the long cylinder as it is pressed against the apple and prevent complete coring of the apple. The slot 102 in important in releasing the trapped air and allowing the apple to be cored with out fuss. The slot is about twenty five percent of the length of the internal wall and the exterior surface of the long cylinder 58. The keen edge of the side extent 104 of the slot is capable of peeling away skin of a thin skinned fruit. The peeling is accomplished when the tapered edge of the long cylinder is not being used.

It is important to note that the terms top, bottom, upper and lower as used here are not exact descriptions of the parts of the instrument. However, when top, bottom, upper and lower are used there is really no top, bottom, upper or lower but a forward and rearward dependent upon the use of the instrument.

Finally, the short cylindrical shell 12 including the tab 36 and the external threaded portion 32 is formed as a premolded plastic unit. The long cylinder 58 including the cylindrical tapered edge 82 and the longitudinal slot 102 is formed as a premolded plastic unit. Plastic is used because it does not require sharpening. Also, since plastic does not require sharpening the instrument is safe when the various edges are used to peel the fruit.

The present invention is a safety peeler that has tab, with a sharpened edge on the closed exterior portion of the short cylindrical shell, which is used to peel fruit or cut the fruit. Also, the safety peeler has a cylindrical tapered end and a slot on the long cylinder. The cylindrical tapered end has a sharpened edge that is used to core an apple. The slot has a sharpened edge on a side extent that can be used to peel thin skinned fruit. Additionally, the slot relieves the air pressure when the apple is being cored. The peeler is molded form food compatible plastic in a cylindrical shape with two working ends. The end is a skin peeler that is simply a sharpened tab protruding from the end. It protrudes from the end approximately one quarter of an inch. The other end has a core cutter and a slot that is a skin peeler that utilizes the cylinder as a cutting blade and peeler. The overall size of the utensil is ideal for quickly preparing fruits by hand. It is approximately eight inches long and one inch in diameter, perfect dimensions for ease of use and control. To help prevent trapped air from making a cutting task more difficult, a peeler slot is molded into the second body at its midpoint, this will remove peelings and core easier. To use the peeler the tab is pressed into the skin to the end of the body of the fruit. The user should not have to worry about controlling the depth of the cut. The skin is then much easier to remove for sectioning the fruit. For coring an apple, the open end of the cylinder is pressed into the apple and removed. The slot acts as a peeler and can be used to remove the skin. The tab can be used to section the fruit.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved safety peeler for cutting and peeling fruit comprising, in combination:

a short cylindrical shell of a rigid material having a closed exterior portion and a open interior portion with a cylindrical extension extending therefrom and an exterior surface therebetween with a top edge and a bottom edge, the exterior surface being about 1 inch in diameter, the short cylindrical shell having a length of about 3 inches in length with the cylindrical extension being about 10 percent of the length, the cylindrical extension having a diameter of about ⅞ inch including an external threaded portion;

a generally rectangular tab of rigid material with a thin keen edged upper edge, a rectangular lower edge being in communication with the top portion of the shell and four vertical sides, the tab having a width of about ½ inch and a height of about ¼ inch, each vertical side being equally spaced from the top edge of the exterior surface of the shell, the upper edge having a linear taper capable of cutting a fruit to the depth of about ¼ inch, the upper edge further being capable of cutting away the skin of a citrus fruit;

a long cylinder of rigid material being hollow having an interior opening with a top edge, an exterior opening with a bottom edge and an exterior surface and an internal wall therebetween, the long cylinder having a length of about 5 inches, the exterior surface being about 1 inch in diameter and having a length equal to the length of the long cylinder, the internal wall having a length equal to the length of the cylinder including an internal threaded portion, the internal threaded portion being adjacent to the top edge of the interior opening and being about ten percent of the length of the internal wall, the internal threaded portion further capable of engaging the external threaded portion of the cylindrical shell and placing the long cylinder juxtaposed with the short cylindrical shell;

a cylindrical tapered edge having an upper edge in communication with the bottom edge of the exterior opening of the long cylinder and a lower edge with a thin keen edge extending exteriorly therefrom, the tapered edge being about ¼ inch and 5 percent of the length of the long cylinder, the tapered edge further being capable of boring into an apple at the apple core with the lower edge and causing the core to be slidably received between the internal wall of the long cylinder; and a longitudinal slot formed in the long cylinder having a generally rectangular configuration with a side extent having a thin keen edge and three flush end edges, the slot having a length with the side extent having a length equal to the length of the slot, the slot being in communication with the exterior surface of the long cylinder, the slot being in communication with the internal wall of the long cylinder for release of air pressure to allow ease of insertion of the cylinder into the apple core, the slot being about twenty five percent of the length of the internal wall and the exterior surface of the long cylinder, the keen edge of the slot being capable of peeling away skin of a thin skinned fruit when the tapered edge of the long cylinder is not being used.

2. A new and improved safety peeler for cutting and peeling fruit comprising:

a short cylindrical shell having a closed exterior portion and an open interior portion with a cylindrical extension extending therefrom including an external threaded portion and an exterior surface therebetween with a top edge and a bottom edge;

a generally rectangular tab with an upper edge, a lower edge being in communication with the top portion of the shell and four vertical sides being equally spaced from the top edge of the exterior surface of the shell, the upper edge capable of cutting away the skin of a citrus fruit;

a long cylinder being hollow having an interior opening with a top edge, an exterior opening with a bottom edge and an exterior surface and an internal wall therebetween including an internal threaded portion being adjacent to the top edge of the interior opening, the internal threaded portion capable of engaging the external threaded portion of the cylindrical shell and placing the long cylinder juxtaposed with the short cylindrical shell;

a cylindrical tapered edge having an upper edge in communication with the bottom edge of the exterior opening of the long cylinder and a lower edge extending exteriorly therefrom; and a longitudinal slot formed in the long cylinder being in communication with the exterior surface and the internal wall of the long cylinder having a side extent and three flush end edges, the slot capable of releasing air pressure to allow ease of insertion of the cylinder into the apple core.

3. The safety peeler as set forth in claim 2 wherein the short cylindrical shell is formed of a rigid material.

4. The safety peeler as set forth in claim 2 wherein the short cylindrical shell has a length of about 3 inches in length with the cylindrical extension being about 10 percent of the length and has a diameter of about ⅞ inch.

5. The safety peeler as set forth in claim 2 wherein the exterior surface of the shell has a diameter of about 1 inch.

6. The safety peeler as set forth in claim 2 wherein the tab being formed of a rigid material has a width of about ½ inch and a height of about ¼ inch.

7. The safety peeler as set forth in claim 2 wherein the upper edge has a linear taper thin keen edge capable of cutting a fruit to the depth of about ¼ inch.

8. The safety peeler as set forth in claim 2 wherein the long cylinder formed of a rigid material has a length of about 5 inches with the exterior surface of the long cylinder being about 1 inch in diameter and has a length equal to the length of the long cylinder.

9. The safety peeler as set forth in claim 2 wherein the internal wall of the long cylinder has a length equal to the length of the long cylinder with the internal threaded portion and being about ten percent of the length of the internal wall.

10. The safety peeler as set forth in claim 2 wherein the lower edge has a thin keen edge.

11. The safety peeler as set forth in claim 2 wherein the tapered edge being about ¼ inch and 5 percent of the length of the long cylinder and capable of boring into an apple at the apple core with the lower edge and causing the core to be slidably received between the internal wall of the long cylinder.

12. The safety peeler as set forth in claim 2 wherein the side extent of the slot has a thin keen edge.

13. The safety peeler as set forth in claim 2 wherein the slot has a length with the side extent having a length equal to the length of the slot.

14. The safety peeler as set forth in claim 2 wherein the slot has a generally rectangular configuration being about twenty five percent of the length of the internal wall and the exterior surface of the long cylinder with a thin keen edge of the side extent of the slot capable of peeling away skin of a thin skinned fruit when the tapered edge of the long cylinder is not being used.

\* \* \* \* \*